Patented Feb. 5, 1929.

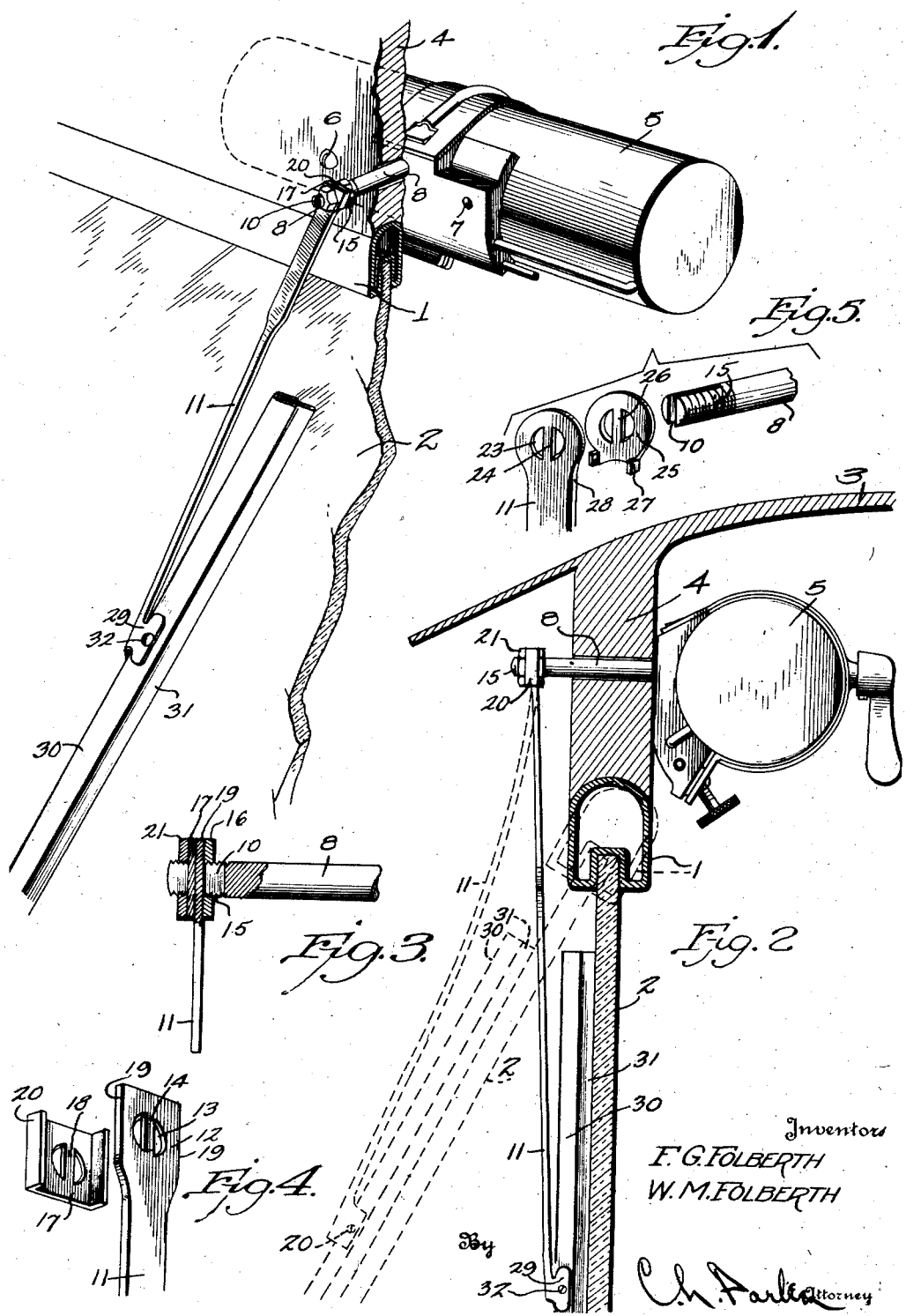

1,701,105

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed May 6, 1925. Serial No. 28,436.

This invention relates to windshield cleaners, and more particularly to means for connecting the cleaner element to the shaft of a cleaner motor.

In a prior patent to William M. Folberth, granted February 7, 1922, No. 1,405,773, there is described and claimed a windshield cleaner consisting of a cleaner element adapted to contact with the surface of the windshield to be cleaned, and means for actuating said cleaner element consisting of an automatically reversible suction motor adapted to be connected to the intake manifold of an internal combustion engine to be operated thereby.

In a later patent to William M. Folberth, Reissue No. 15,502, granted December 5, 1922, there is disclosed another form of windshield cleaner in which the motor is provided with a transverse power shaft adapted to be oscillated by the movement of the movable member in the motor casing and the cleaner element is connected to the motor shaft by means of a cleaner arm to oscillate in an arc of a circle over a portion of the windshield to clean it.

In prior installations, the motor is arranged on the interior of the frame of the windshield and the shaft extends through an opening therein. The cleaner arm is thus always in the same relative position with respect to the plane of the windshield and when the windshield is arranged at an angle to open it, the entire cleaner consisting of the motor, the shaft, the cleaner arm, and the cleaner element move with the windshield.

An object of the present invention is the provision of a cleaner arm which will retain the cleaner element in contact with the outer surface of the windshield and which is sufficiently flexible to permit the windshield to be moved without moving the cleaner motor.

In certain types of automobiles, it is desirable to place the cleaner motor within the vehicle on a portion of the body of the car and when the wind shield is opened, the motor casing does not move. As the windshield is moved outwardly, it is therefore necessary to provide a cleaner arm which is capable of being moved outwardly from its normal position to permit the windshield to be opened.

In the form of the invention herein shown and described, the cleaner arm is formed of a flat strip of resilient sheet metal with the strip arranged in a plane parallel to the plane of the windshield which gives it sufficient strength laterally to actuate the cleaner element and at the same time, gives it sufficient flexibility to permit it to move outwardly away from the front of the vehicle body when the windshield is opened.

In the accompanying drawings, we have shown one embodiment of the invention. In this showing:

Figure 1 is a perspective view of a portion of the front of the body of a motor vehicle showing the invention applied, parts being shown in section, Figure 2 is a vertical sectional view through a portion of the body of the vehicle and windshield, Figure 3 is a detail view of the end of the motor shaft, Figure 4 is a perspective view of the upper end of the cleaner arm, and, Figure 5 is a similar view of another form of the invention.

Referring to Figures 1 to 4 of the drawings, the reference numeral 1 designates a windshield frame of the usual construction, having a pane 2 of glass or other transparent material arranged therein. The windshield is arranged in a vehicle in the usual manner and is adapted to be opened for ventilation. As the construction and arrangement of the windshield forms no part of the present invention, the manner of mounting it in the body of the car is not shown. A portion of the top of the vehicle body of the car is shown at 3, and between the top of the vehicle and the top of the windshield frame, there is provided a depending portion 4.

In installing the windshield cleaner, a motor 5 is arranged on the inner side of the depending member 4 and secured thereto by means of bolts 6 passing through the depending member and received in openings 7 in the motor casing. The depending member is provided with an opening through which the shaft 8 of the motor passes to the exterior. As shown, this shaft is provided with a threaded outer end formed with a slot 10.

The cleaner arm forming the subject matter of the present invention consists of a flat strip 11 of resilient sheet metal, provided with an enlargement 12 at its upper end. This enlargement is provided with a substantially circular opening 13, adapted to receive the shaft 8, and a member 14 extending diametrically of the opening and adapted to be received in the slot 10 to rigidly connect the cleaner arm to the shaft and prevent relative rotation.

The end of the shaft is threaded, as at 15, and in arranging the cleaner arm on the shaft, a nut 16 is first placed thereon. The cleaner arm is then placed in position outwardly of the nut, as shown. A washer 17 is then placed on the shaft. As shown, the washer is provided with a diametrically extending member 18 which is received in the slot 10 of the shaft to couple it to the shaft. The enlarged upper end of the cleaner arm is substantially rectangular, providing straight side walls 19. The sides of the washer are provided with flanges 20, adapted to contact with the sides of the cleaner arm. A nut 21 is then arranged on the shaft outwardly of the washer.

In the form of the invention shown in Figure 5 of the drawings, the enlarged upper end of the cleaner arm is substantially circular in shape, as shown at 22. It is further provided with a circular opening 23, having a diametrically extending key 24 adapted to be received in the slot 10 of the cleaner arm. In place of the washer 17, I employ a circular washer 25 having a diametrically extending key 26 and having lugs 27 arranged at the bottom and adapted to engage the substantially straight sides 28 of the cleaner arm.

The lower end of the cleaner arm is provided with a holder 29, which may advantageously be formed integral with the arm when the arm is constructed of sheet metal. This holder is adapted to receive a backing strip 30 of rigid material and a flexible strip 31 of rubber or similar material adapted to contact with the surface of the windshield to clean it. As shown, a screw 32 passes through the holder and is received in the backing strip to secure the cleaner element in place. The holder is formed of a pair of oppositely disposed webs which are elongated adjacent their outer edges where they receive the backing strip and are reduced adjacent the junction of the cleaner arm to reduce the weight of the cleaner arm as much as possible.

The operation of the device will be apparent from the foregoing description. As shown in dotted lines in Figure 2 of the drawings, the portion of the windshield shown, which is the upper half, opens outwardly from the vehicle body for ventilation. With the cleaner motor arranged on the immovable part of the vehicle body as shown, the movement of the windshield does not change the position of the motor casing 5 of the shaft 8 and it is, therefore, necessary for the cleaner arm 11 to give to permit the upper half of the windshield to be opened. By employing the construction shown, in which the cleaner arm consists of a flat strip of resilient metal, the cleaner arm is capable of giving and assuming the dotted line position shown when the upper half of the windshield is opened. At the same time, the resiliency of this arm maintains the cleaner element in contact with the surface of the windshield at all times for cleaning. The strip 11 is of sufficient width to prevent it from flexing laterally and is, therefore, capable of transmitting the power from the shaft to the cleaner element which frictionally engages the surface of the windshield.

The method of securing the cleaner arm to the shaft forms a positive connection and assures proper movement of the arm with the shaft, preventing relative oscillation or rotation of these members. With the key 14 or 24 arranged in the slot, relative movement of the cleaner arm and the shaft is impossible. The coupling of the cleaner arm to the shaft is further strengthened by the washer 17 or 25, having the flanges 20 or 27 engaging the sides of the cleaner arm. The cleaner arm may be formed of relatively light material and the washer of heavier stock, whereby the flanges on the washer serve as driving means to transmit power from the shaft to the cleaner arm and further prevent loosening of the arm on the shaft. The tension of the cleaner arm against the surface may be adjusted by binding the cleaner arm toward or away from the windshield or by changing the position of the upper end of the cleaner arm on the shaft. This may be readily accomplished by moving the nuts 16 and 21 either inwardly or outwardly.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

We claim:

1. In a connection of the kind described, a shaft threaded at one end and provided with an axial slot extending substantially through the threaded portion and opening through the end of the shaft, an arm having a shaft-receiving opening formed with an integral key part extending into the opening and adapted to be received in the slot of the shaft when the shaft is inserted through the arm opening, a nut arranged on each side of the arm and threaded on the shaft for clamping the arm in position thereon whereby the arm may be adjustably positioned along the shaft, and a reinforcing member keyed to the shaft and coupled to the arm, said reinforcing member being interposed between one of the nuts and the arm and held in coupled relation with the latter by said nut.

2. In a connection of the kind described, a shaft threaded at one end and provided with an axial slot extending substantially through the threaded portion and opening through the end of the shaft, an arm having a shaft-receiving opening for receiving the shaft, a nut arranged on each side of the arm and threaded on the shaft for clamping the arm in position thereon whereby the arm may be adjustably positioned along the shaft, and a reinforcing member keyed to the shaft and coupled to the arm, said reinforcing member being interposed between one of the nuts and the arm and held in coupled relation with the latter by said nut.

3. In a connection of the kind described, a shaft threaded adjacent one end and being provided with a longitudinally extending slot, an arm having an opening therein for the reception of said shaft, a projection formed on said arm and extending into the slot of the shaft for keying the arm thereto, and nuts threaded on the shaft at opposite sides of the arm for clamping the arm therebetween and adjustably securing the arm to said shaft.

4. In a connection of the kind described, a shaft threaded adjacent one end and being provided with a longitudinally extending slot, an arm having an opening receiving the shaft, clamping members arranged on said shaft at opposite sides of said arm and engaging the threads of said shaft for adjustment thereon, a washer between said arm and one of said nuts, said washer being provided with a keyed part received in said shaft slot, and extensions formed on said washer and engaging the sides of said arm to couple said arm to said shaft, said nuts being adjustable to clamp the arm and washer therebetween and thereby secure said extensions in engaging relation with the sides of said arm.

In testimony whereof, we affix our signatures.

FREDERICK G. FOLBERTH.
WILLIAM M. FOLBERTH.